F. E. SWOPE, Jr.
GROUND JOINT CONNECTION.
APPLICATION FILED MAR. 17, 1909.
946,990. Patented Jan. 18, 1910.
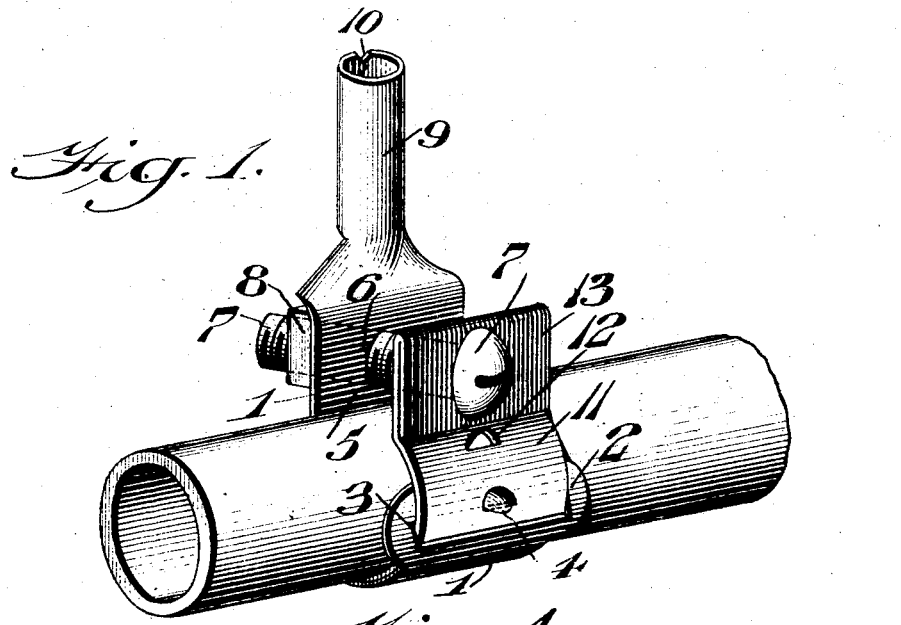
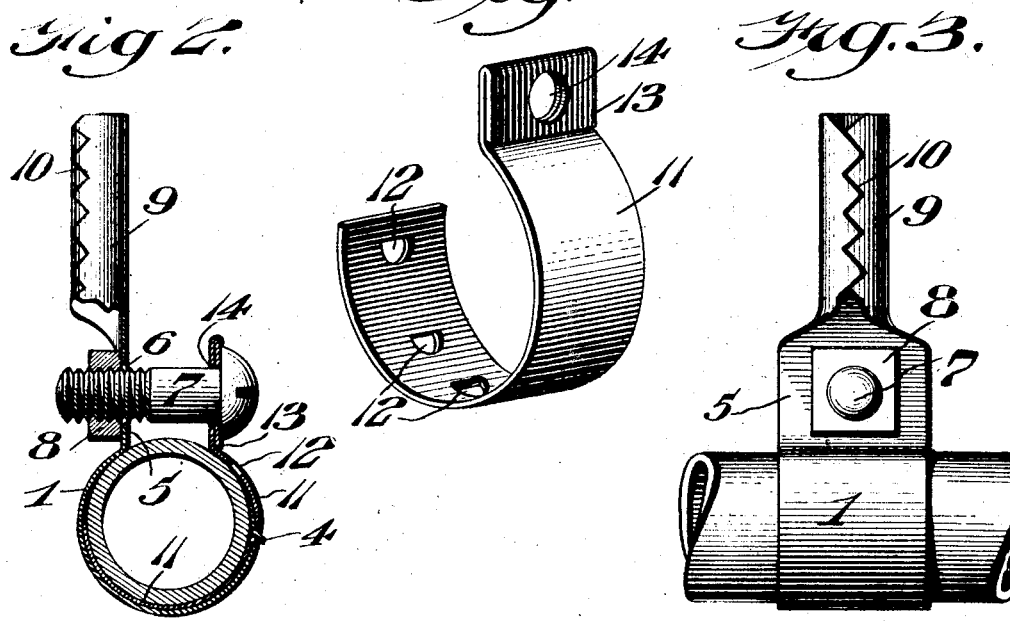
Inventor
Frederick E. Swope, Jr.

UNITED STATES PATENT OFFICE.

FREDERICK E. SWOPE, JR., OF PHILADELPHIA, PENNSYLVANIA.

GROUND-JOINT CONNECTION.

946,990.   Specification of Letters Patent.   Patented Jan. 18, 1910.

Application filed March 17, 1909. Serial No. 483,936.

*To all whom it may concern:*

Be it known that I, FREDERICK E. SWOPE, Jr., a citizen of the United States, residing in the city and county of Philadelphia, State of Pennsylvania, have invented a new and useful Ground-Joint Connection, of which the following is a specification.

My invention consists of a novel construction of a ground joint connection adapted to be readily secured to the conductor and wherein means are provided for adjusting the clamp, thereby adapting the same to be secured to different sizes of pipes and means being provided for tightening the connection around the pipe and locking it in position so that any movement of the same is prevented and the clamp is firmly held in position.

It further consists of a novel construction of a ground connection which consists of a flexible band made in sections, said sections having means thereon for interlocking the sections at various points in order to adapt the band to receive different sizes of pipes, means being also provided for securing the sections together to lock the same in position around the pipe and one of said sections having means thereon for readily and quickly securing the same to the end of the conductor.

It further consists of a novel construction of a ground connection consisting of a flexible band in sections adapted to interlock with each other and adapted to be adjusted for pipes of different diameters, one of said sections being deflected in order to adapt the same to be tightened around one end of a conductor, the end of the other section being deflected rearwardly upon itself in order to form an abutment for the head of the bolt and the nut for the bolt being prevented from rotation owing to the manner in which the band is deflected in proximity thereto.

It further consists of other novel features of construction all as will be hereinafter fully set forth.

For the purpose of illustrating my invention I have shown in the accompanying drawings one form thereof since this embodiment is at present preferred by me and gives reliable and satisfactory results in practice, although it is to be understood that the various instrumentalities of which my invention consists can be variously arranged and organized and that my invention is not limited to the precise arrangement and organization of these instrumentalities as herein set forth.

Figure 1 represents a perspective view of a ground joint connection embodying my invention, the same being shown in assembled position with respect to a pipe. Fig. 2 represents a sectional view of Fig. 1. Fig. 3 represents a side elevation of my device in assembled position with respect to a pipe. Fig. 4 represents a perspective view showing the flexible adjusting band in detached position, said adjusting band being of greater length than the corresponding adjusting band seen in Figs. 1 and 2, in order to adapt the connection to be secured to pipes of a larger diameter.

Similar numerals of reference indicate corresponding parts in the figures.

Referring to the drawings:—1 designates the body portion of the clamp which is preferably formed of copper or other suitable conducting material and preferably of thin material in order to form a flexible band, said band being provided at one end with the head 2, having a slot 3 therethrough.

4 designates a lug preferably integral with the body portion and located in alinement with or in close proximity to the outer edge of the slot 3, said lug extending outwardly from the body and being curved, as will be seen from Fig. 1.

The body portion 1 is deflected in order to form the flat portion 5 which is provided with an aperture 6, through which passes a screw 7, the latter being provided with a suitable nut 8. Above the flattened portion 5 the end of the body 1 is bent upon itself to form a tubular casing 9 which is adapted to receive the end of the conductor when it is inserted therein, it being noted that the inner sides of the casing 9 are serrated as indicated at 10 in order that the teeth formed thereby may be pressed firmly against the conductor after it has been inserted in place in the casing 9. Owing to the manner in which the body portion 1 is deflected to form an abutment for the nut 8 the rotation of the latter will be limited by its abutting against the body portion 1 when the screw 7 is adjusted.

11 designates an adjusting band of any suitable size, the same being preferably formed of copper or other suitable conducting material and preferably of flexible material so that the inner portion thereof may conform to the curvature of the pipe and of the body 1, it being understood from Figs. 1 and 2 that this adjusting band 11 is adapted to be passed through the slot 3 in the head 2 of the body 1. The adjusting band 11 is provided with any desired number of apertures 12 of any desired shape with which the lug 4 is adapted to interlock in order that the body 1 and the band 11 can be adjusted with respect to each other and held in their adjusted position in order to accommodate pipes of different diameter. The end of the adjusting band 11 is deflected rearwardly upon itself in order to reinforce the end thereof and to form an abutment for the head of the screw 7 which passes through the aperture 14, as will be understood by reference to Fig. 1. The adjusting band 11, seen in Fig. 4, is precisely similar to that seen in the other figures of the drawings excepting that the same is shown as being of a greater length than the adjusting strip shown in the other figures, it being apparent that the adjusting band may be of any desired length and the apertures therein may be located at any desired points thereon. In attaching the ground joint connection with the pipe, the adjusting band 11 is placed through the slot 3 so as to contact with the pipe and the lug 4 interlocks with an aperture 12, such aperture depending, as will be apparent, upon the diameter of the pipe. The screw 7 is then placed in the opening 14 in the adjusting band 11 and through the opening 6, the threaded portion of said screw engaging the nut 8 so that when the screw 7 is tightened the body portion 1 and the adjusting band 11 will be rigidly clamped around the pipe so as to form a good connection therewith. The end of the conductor is secured in the socket 9 by deflecting the serrated edges 10 thereof against the conductor, as will be readily apparent to those skilled in this art.

By forming the connection of two parts in the manner herein disclosed, such parts being adapted to interlock with each other, a clamp is formed which may be readily and quickly adapted to be employed in conjunction with pipes of different diameters so that when the fastening device is assembled, the ground connection will be rigidly secured in place and since the body portion and the adjusting band are formed of flexible material, these will readily conform to the curvature of the pipe when the fastening device is adjusted.

In the embodiment illustrated in the drawings, the body portion 1 and the adjusting bands 11 consist of flat metallic bands having a smooth contact face which closely engages the outer surface of the pipe.

It is to be understood that the adjusting band 11 may be of any desired length and the holes 12 therein located at any desired point thereon in order to accommodate the clip for various sizes of pipes and by employing adjusting bands of different lengths my novel construction or ground joint connection may be readily and quickly adapted for pipes of any size, met with in practice, without the use of any tools. Owing to the manner in which the outer end of the adjusting band through which the fastening device passes is deflected there is no liability of the fastening device breaking or tearing the end of the adjusting band, when the same is tightened.

It will now be apparent that I have devised a novel and useful construction of a ground joint connection which embodies the features of advantage enumerated as desirable in the foregoing and while, in the present instance, I have shown a preferred embodiment thereof which gives good results in practice, it is to be understood that the same is susceptible of modifications in various particulars without departing from the spirit and scope of the invention or sacrificing any of its advantages.

Having thus described my invention, what I claim as new and desire to secure by Letters Patent, is:—

1. In a device of the character described, a flexible body portion having a laterally extending slot therein, a flexible adjusting band passing through said slot from the outside inwardly, whereby the end thereof is tightly held between the body portion and the conductor when the device is in operative position, said band having a plurality of openings with one of which said lug engages, and means passing through said body portion and said band for drawing the ends thereof together for locking the same around a suitable conductor.

2. In a device of the character described, a flexible body portion having an enlarged head and a laterally extending slot therein, an outwardly extending lug on said body portion, a flexible adjusting band extending through said slot and having a plurality of openings with one of which said lug engages for holding the band and body portion together, and means passing through said body and band for drawing the ends thereof together for locking the same around a suitable conductor.

3. In a device of the character described, a flexible body portion having an enlarged head and a laterally extending slot therein, a curved outwardly extending lug on said body portion, a flexible adjusting band extending through said slot and having a plurality of openings with one of which said lug engages for holding the band and body portion together, and means passing through said body and band for drawing the ends thereof together for locking the same around a suitable conductor.

FREDERICK E. SWOPE, Jr.

Witnesses:
C. D. McVay,
H. S. Fairbanks.